United States Patent [19]

Wingert

[11] Patent Number: 5,379,523
[45] Date of Patent: Jan. 10, 1995

[54] TAPE LOCK MECHANISM

[75] Inventor: Rudolf Wingert, West Milford, N.J.

[73] Assignee: Arrow Fastener Co., Inc., Saddle Brook, N.J.

[21] Appl. No.: 121,570

[22] Filed: Sep. 16, 1993

[51] Int. Cl.$^6$ .............................................. G01B 3/10
[52] U.S. Cl. .................................. 33/767; 33/769; 242/381.3
[58] Field of Search ................. 33/761, 767, 769; 242/381.3, 385.4, 396, 396.5, 410

[56] References Cited

U.S. PATENT DOCUMENTS

| | | | |
|---|---|---|---|
| 3,570,782 | 3/1971 | Hayes et al. | 242/381.3 |
| 4,474,340 | 10/1984 | Duda | 242/396.5 |
| 4,663,854 | 5/1987 | Miller et al. | 33/767 |
| 4,976,048 | 12/1990 | Blackman | 33/767 |
| 4,998,356 | 3/1991 | Chapin | 33/761 |
| 5,001,843 | 3/1991 | Chapin | 33/767 |
| 5,007,178 | 4/1991 | Dewire et al. | 33/767 |
| 5,210,956 | 5/1993 | Knispel | 33/767 |

FOREIGN PATENT DOCUMENTS

2108930  5/1983  United Kingdom ................ 33/767

*Primary Examiner*—William A. Cuchlinski, Jr.
*Assistant Examiner*—G. Bradley Bennett
*Attorney, Agent, or Firm*—Fitzpatrick, Cella, Harper & Scinto

[57] ABSTRACT

A retractable tape measure is disclosed which includes a housing having an opening formed therein, a coiled tape rule within the housing and a free end extending through the opening. A coiled spring is provided to retract the tape rule into the casing and a lock assembly is provided to selectively lock the tape rule in an extended position and release it for retraction into the casing. The lock assembly includes an actuator member that is pivotally mounted on the casing for pivotable movement between a locking and an unlocking position and a tape locking blade having one end positioned to engage the tape and an other end defining a bearing surface, the tape locking blade being mounted in the casing for movement between locking and unlocking positions. A connecting link is provided which has one end located in bearing engagement with the bearing surface of the locking blade and an opposed end pivotally connected to the actuator member in a predetermined position to provide an over-the-center action to lock the blade in the locking position. The locking blade includes integrally formed spring arms engaged with the casing for applying a biasing force to the locking blade to urge the locking blade against the locking action of the actuator member and thereby move the locking blade to the unlocked position when the actuator member is moved to its unlocked position.

7 Claims, 4 Drawing Sheets

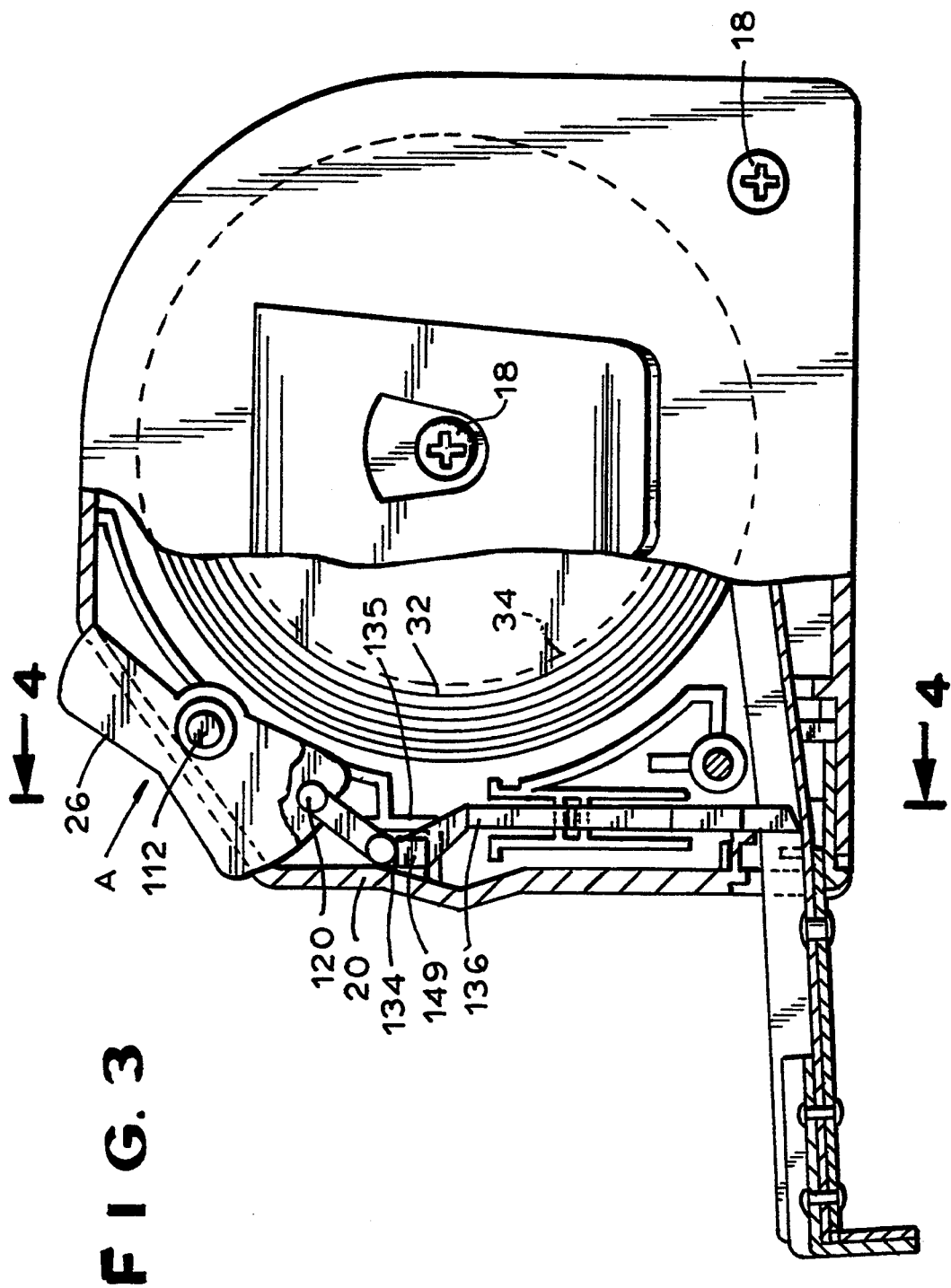

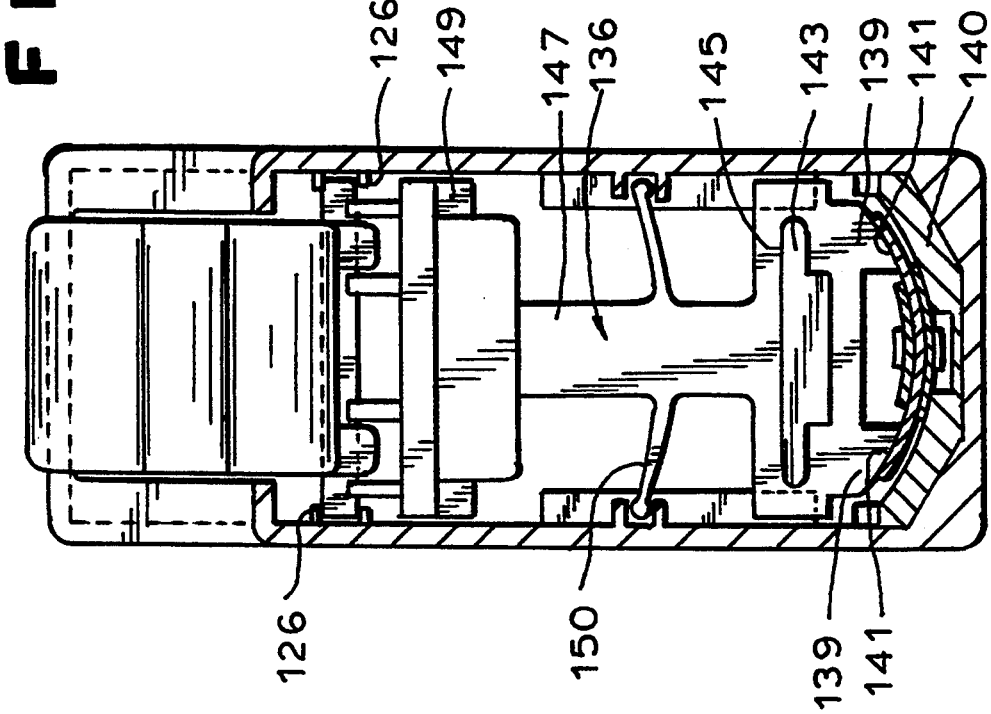
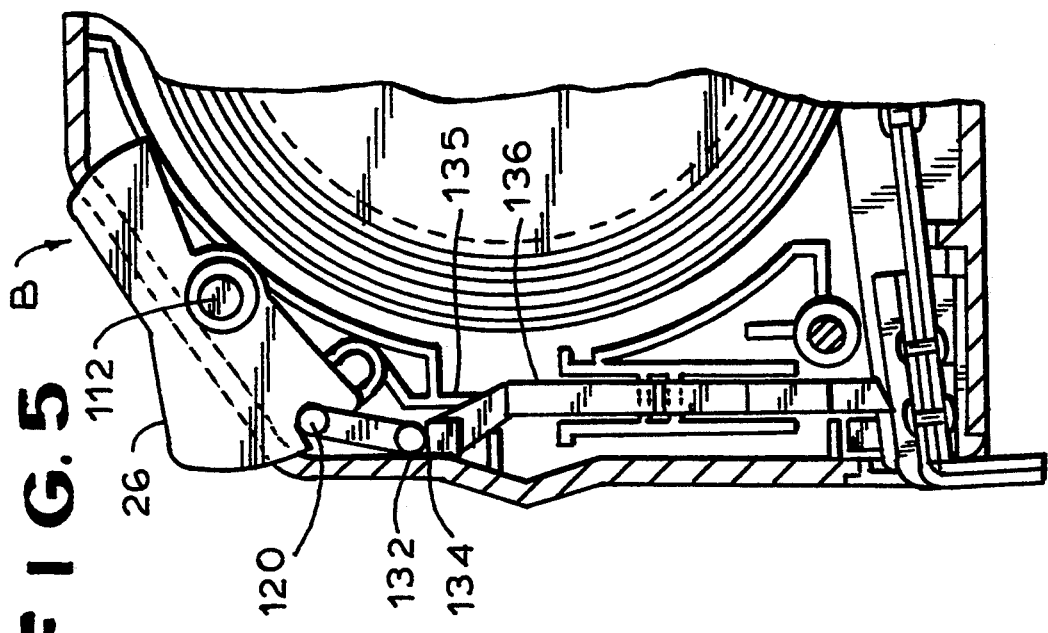

TAPE LOCK MECHANISM

BACKGROUND OF THE INVENTION

The present invention relates to retractable measuring tapes and more in particular to an improved measuring tape having an improved tape lock mechanism.

Retractable tape measures have been commercially available for many years. These tape measures generally are formed as a steel coiled tape contained within a plastic or metal casing with a coiled spring mounted within the coiled tape to provide a biasing force that tends to automatically recoil and rewind the tape within the casing. Such tape measure devices have been provided with a variety of auxiliary features, such as for example tape lock mechanisms which, when activated, serve to hold the tape in an extended position against the bias of the recoil spring. Such tape lock mechanisms are shown, for example, in U.S. Pat. No. 5,210,956 commonly assigned herewith; as well as in U.S. Pat. Nos. 4,976,048; 4,131,244; 4,205,446; 4,153,996; 4,938,430; 5,001,843; and 4,462,160. These various tape lock mechanisms are relatively complex, with some requiring direct connection between a locking blade and a manually operated actuator, and others requiring separate spring members to retract the locking blade when it is desired to retract the tape rule into the casing.

An object of the present invention is to provide an improved tape measure which is relatively simple to manufacture and durable in use.

Another object of the present invention is to provide a retractable tape measure having an improved tape locking mechanism.

Yet another object of the present invention is to provide a tape locking mechanism including integral retraction means.

In accordance with an aspect of the present invention a retractable tape measure is provided which includes a housing or casing having an opening formed therein through which the free end of a coiled tape rule extends. A retraction spring is contained within the casing, generally within the confines of the coiled tape rule, to retract the rule into the casing after it has been extended.

The tape measure of the present invention is selectively locked in an extended position by a locking means or assembly mounted in the casing. The locking assembly includes an actuator member which is movably mounted on the casing for movement between locking and unlocking positions. The tape lock blade is also mounted in the casing for movement between a locking position in which one end of the locking blade is engaged with the tape rule and an unlocking position in which the tape is released for retraction. A connecting link is engaged between the actuator member and the locking blade for transmitting movement of the actuator member to the locking plate. The locking blade includes integrally formed spring means engaged with the casing for applying a biasing force to the locking blade which urges the locking blade against the locking action of the actuator member to move the locking blade to the unlocked position when the actuator member is moved to its unlocked position.

The above, and other objects, features and advantages of this invention will be apparent from the following detailed description of an illustrative embodiment thereof, which is to be read in connection with the accompanying drawings, wherein:

FIG. 3 is a side view of the tape measure shown in FIG. 1, with part of one side broken away to illustrate the tape lock mechanism in its locked position;

FIG. 4 is a sectionally view along line 4—4 FIG. 3;

FIG. 5 is a side view similar to FIG. 3 showing the locking mechanism in its unlocked position.

Figure 1:
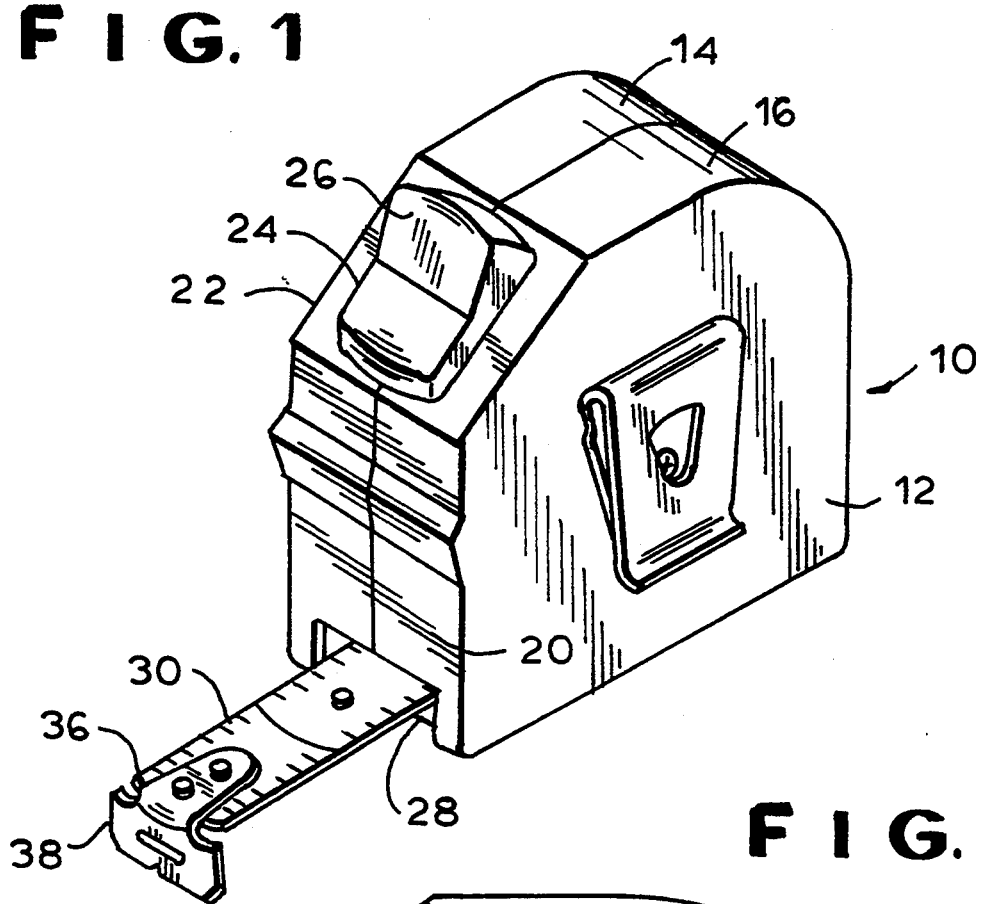
FIG. 1 is a perspective view of a retractable tape measure constructed in accordance with the present invention.

Referring now to the drawing in detail, and initially to FIG. 1 thereof, a retractable tape measure 10, constructed in accordance with the present invention is illustrated. Tape measure 10 includes a housing or casing 12 formed of two half casing elements 14, 16 of generally identical internal configurations. The casing halves are secured together by a plurality of screws 18 in a known manner. The two halves of the casing define a front end 20 including an upper inclined top-wall section 22. Wall 22 has an opening 24 formed therein through which a finger actuator member 26 of the tape lock mechanism extends.

The lower end of front wall 22 includes an opening 28 formed therein through which the tape rule 30 can be extended and retracted. Tape 30 is formed as a coiled steel member in any known manner. The tape is coiled about a hub 32 and its inner end is secured to the hub in any convenient manner. A coiled spring 34, schematically illustrated in FIG. 3, is located within hub 32 and its inner end is connected to a central shaft formed in the housing at the location illustrated by the central screw 18 in FIGS. 2 and 4. This coil spring operates in a known manner to automatically retract the tape into the casing. Because this mechanism is known, there is no need to describe it in detail.

Tape 30 has a free end 36 to which a finger tab or pull tab 38 is secured in any convenient manner.

Figure 2:
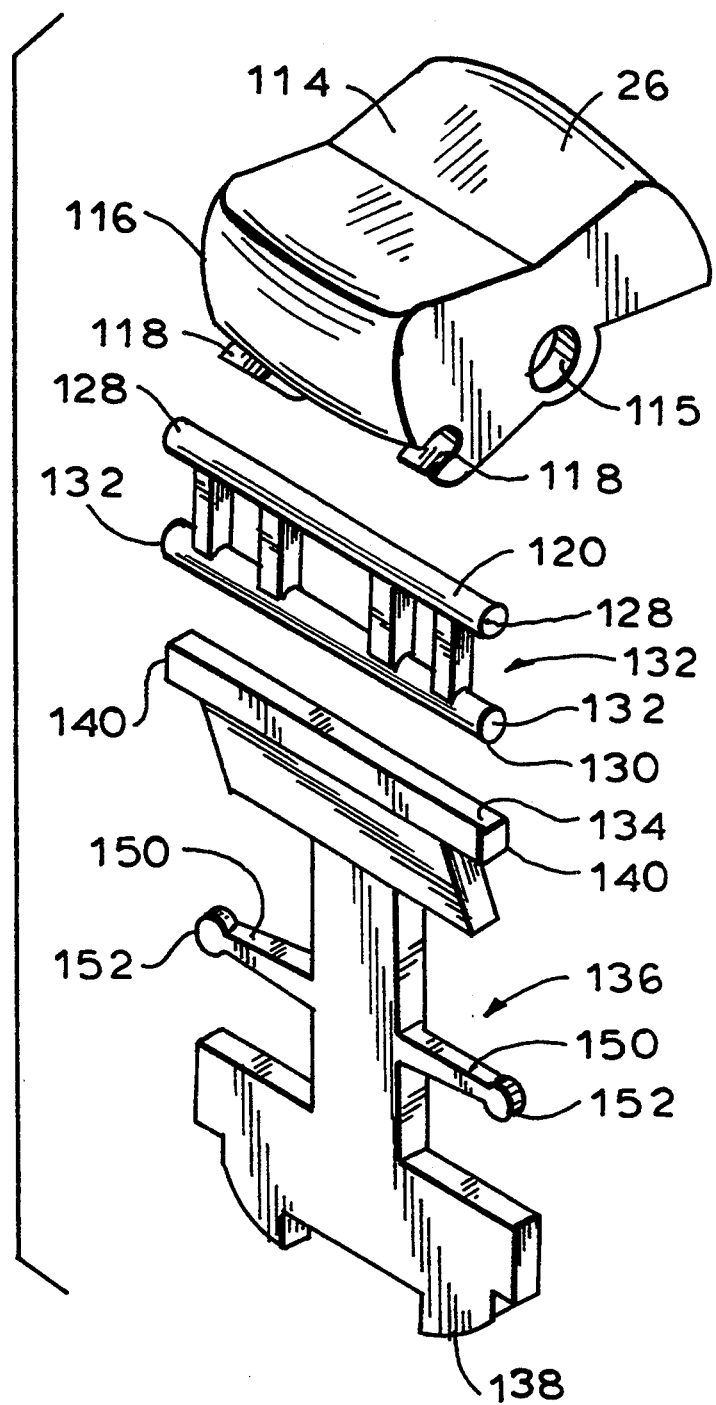
FIG. 2 is an exploded perspective view of the tape lock mechanism of the invention.

In order to lock tape 30 in the extended position shown in FIG. 3, a tape lock mechanism 110 is provided. This mechanism includes the actuator rocker 26 which is pivotally mounted on a post 112 along a first pivot axis between the casing halves 14, 16 in any convenient manner. In the illustrated embodiment of the invention the casing halves have bosses 113 formed thereon which define the post 112 and which are received in the aperture 115 formed in the member 26, as seen in FIG. 2.

Rocker 26 has exposed surfaces 114 which are engaged by the operator to move the rocker between the positions shown in FIG. 3 (the locked position) and the position shown in FIG. 5 (the unlocked position).

The forward end 116 of rocker 26 has a U-shaped opening or slot 118 formed therein. The opening or slot 118 receives the transverse bar 120 of a connecting link 122 thereby to form a pivotable connection along a pivot axis with a link 122.

Figure 6:
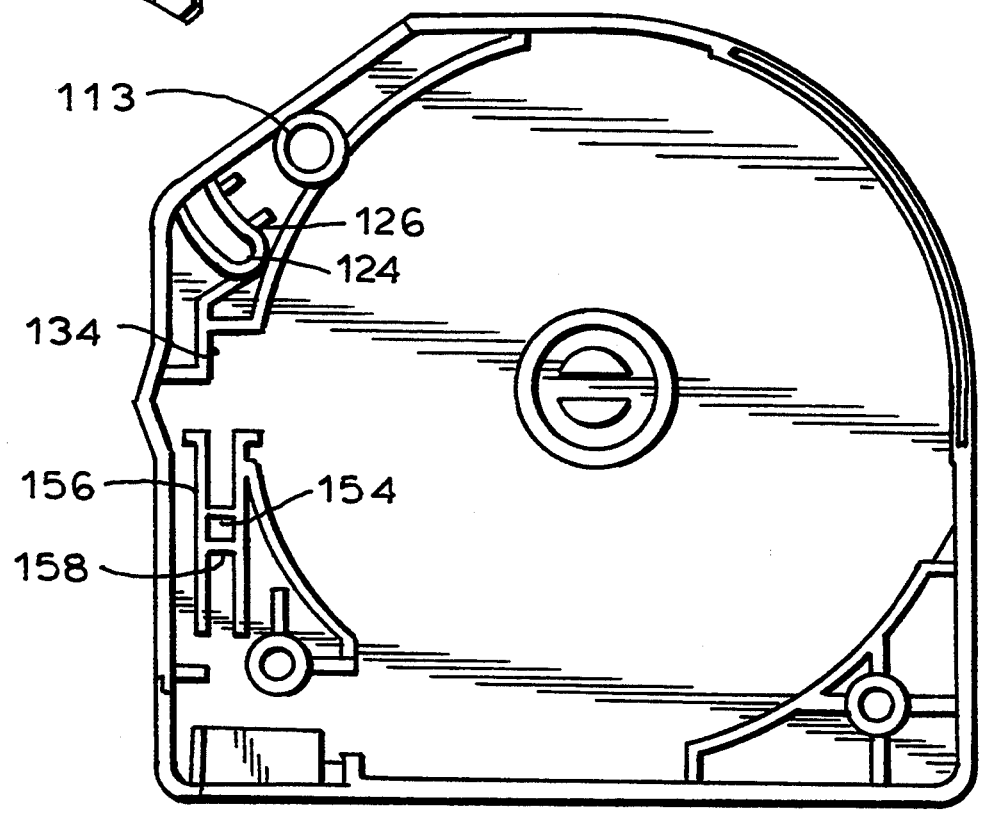
FIG. 6 is a side view of one half of the casing of the tape measure of the invention, with the locking mechanism and tape rule removed.

As illustrated in FIGS. 5 and 6, the casing halves 14, 16 have arcuate guide slots 124 formed therein by the wall 126 which slots receive the ends 128 of connecting link 122. This arcuate guide slot guides pivotable movement of the connecting link upon pivotable movement of actuator member 26.

Connecting link 122 includes a lower transverse bar or member 130. The ends 132 of this bar are constrained to vertical movement between the front wall 20 of the casing halves and a vertical guide wall 135 formed in each of the casing halves, as illustrated in FIGS. 3, 5 and 6. This bar bears on the bearing surface 134 of the locking blade 136 using the locking mechanism of the present invention.

Locking blade 136 is most clearly illustrated in FIG. 2. It is a one piece integrally formed plastic member having a lower locking end 138 and the upper bearing surface 134. The lower locking end 138 includes two bearing pads 139 formed thereon which have arcuately formed edges 141 that generally conform to the configuration of the tape, as seen in FIG. 4, which rides on a guide surface 140 in the separate bumper 141' located in casing opening 28. Locking end 138 includes a generally T-shaped through slot 143 formed therein which defines a thin cross bar 145 at the lower end of the central web 147 of blade 136. Upon movement of actuator 26 to the locking position, as seen in FIG. 3, the end 138 of locking blade 136 is urged downwardly to engage pads 139 with the tape and thereby lock the tape rule against surface 140 in an extended position. Because bar 145 is relatively thin and formed of a plastic material it will flex slightly when the blade 136 moves into the locked position to provide a spring-like face to pads 141 locking the tape in place.

As seen in FIGS. 3 and 5, the ends 149 of the bearing surface 134 also extend into the space defined by the front wall 20 of the casing and the interior walls 135 of the casing halves to guide the locking blade in a vertical path of travel along with the bearing bar 132 of connecting member 122. Thus, upon movement of actuator 26 in a counterclockwise direction, as seen in FIG. 3 and as indicated by the arrow A, the connecting link 122 is urged downwardly against blade 136 to move it downwardly and into locking engagement with the tape.

The location of the pivot connection 112 for the actuator member 26 and the pivotal connection between bar 120 and the actuator member are selected so as to provide an over-the-center action. Thus, as seen in FIG. 5, the pivotal connection for the bar 120 and the actuator member 26 is located to the left of an imaginary line drawing between the pivot axis defined by connection 112 and the point of contact between the bearing bar 132 and the bearing surface 134 of the locking blade 136. A pivotal movement of actuator 26 from the position shown in FIG. 5 to the position shown in FIG. 4 forces bearing bar 132 downwardly and the pivot axis defined between bar 120 and actuator 26 to the right in slot 124. When the actuator member reaches its locked position the pivot axis defined by the bar 120 has moved "over-the-center" and is then located to the right of the point of contact between the bearing bar 132 and bearing surface 134. This over-the-center action holds the locking blade in the downward locked position until the actuator member is manually pivoted in the opposite direction, indicated by the arrow B in FIG. 5.

Since connecting link 122 is not physically connected to locking member 136, pivotal movement of actuator 26 from the locked position to the unlocked position will not, by itself, cause locking blade 136 to move away from the tape rule. To insure that the locking blade moves away from the tape rule in order to unlock the rule, the locking blade is provided with a pair of spring arms 150 which extend laterally or transversely of the path of the direction of movement of the locking blade between its locked and unlocked positions. These arms, being relatively thin and formed of the same plastic material as the locking blade are relatively flexible. The arms have free ends 152 which in the illustrative embodiment have rounded surfaces. These free ends are retained within recesses 154 respectively formed in casings 14, 16 by walls 156, 158 as illustrated in FIG. 6. In the unlocked position the arms are unstressed and generally horizontal. However, when the actuator member 26 is moved to the locked position and blade 136 is thereby moved downwardly, as illustrated in the drawings, towards the tape rule, the arms 150 flex, as illustrated in FIG. 4. This applies an upward biasing force to lock member 136. However, upward movement of the lock member is resisted in the locked position because of the over-the-center action of the actuator member and the connecting member. When the actuator member is moved to its unlocked position, shown in FIG. 5, the pressure against the locking blade previously applied by the actuator member is released and the spring arms relax urging the locking blade upwardly to release pressure on the tape rule and permit the tape to automatically retract.

By this construction it is seen that a relatively simply manufactured and assembled locking mechanism is provided for a tape measure. The mechanism is reliable in use and will not jam. It is formed of simple molded parts which do not require either so called "live hinges", which are subject to breakage, or separate spring retraction arrangements.

Although an illustrative embodiment of the present invention has been described here and with reference to the accompanying drawings, it is to be understood that the invention is not limited to that precise embodiment and that various changes and modifications can be effected herein without departing from the scope or spirit of this invention.

What is claimed is:

1. A retractable tape measure comprising a casing having an opening formed therein, a coiled tape rule within said casing having a free end extending through said opening in said casing, means for retracting the tape rule into the casing, and means for locking the tape rule in an extended position and releasing the tape rule for retraction into the casing, said locking means including an actuator member movably mounted on said casing between a locking and an unlocking position, a tape lock blade mounted in said casing for movement between a locking position in which the locking blade is engaged with the tape rule and an unlocked position wherein it is released from engagement with the tape rule, and separate connecting means operatively engaged between said actuator member and said locking blade for transmitting movement of the actuator member to the locking blade when the actuator member is moved from said unlocked position to said locked position, said locking blade including integrally formed spring means engaged with said casing for applying a biasing force to said locking blade which urges the entire locking blade against the locking action of the actuator member and for moving the locking blade to said unlocked position when the actuator member is moved to its unlocked position.

2. A retractable tape measure as defined in claim 1 wherein said spring means comprise a pair of oppositely extending flexible arms projecting from the locking blade transversely of its path of movement between said locking and unlocking positions, said arms having free ends and said casing having cooperating means formed therein engaged with said free ends to prevent movement thereof upon movement of said locking blade.

3. A retractable tape measure as defined in claim 2 wherein said locking blade has a bearing surface thereon adjacent said actuating member, said connecting means comprising a separate link member having one end bearing on said bearing surface.

4. A retractable tape according to claim 2 wherein said spring means comprises a pair of oppositely extending flexible arms projecting from the locking blade transversely of its path of movement between said locking and unlocking positions, said arms having free ends and said casing having cooperating means formed therein engaged with said free ends to prevent movement thereof upon movement of said locking blade.

5. A retractable tape measure as defined in claim 3 wherein said link member is pivotally connected to said actuator member along a first pivot axis.

6. A retractable tape measure as defined in claim 4 wherein said actuator member is pivotally mounted in said casing for pivotal movement about a second pivot axis between said locking and unlocking position, the pivotal connection between said connecting link and actuator member and said first pivot axis moving in an arcuate path about said second pivot axis upon movement of said actuator member, to one side and the other of a position in which said second pivot axis is aligned with said bearing surface and second axis in an over-the-center action.

7. A retractable tape measure comprising a casing having an opening formed therein, a coiled tape rule within said casing and having a free end extending through said opening, means for retracting the tape rule into the casing, and locking means for selectively locking the tape rule in an extended position and releasing the tape rule for retraction into the casing, said locking means including an actuator member pivotally mounted on said casing for pivotal movement between a locking and an unlocking position, a tape lock blade having a tape engaging end and a bearing surface formed thereon spaced from said tape engaging end, said blade being mounted in said casing for movement between a locking position in which the tape engaging end is engaged with the tape rule and an unlocked position in which the tape engaging end is released from engagement with the tape rule, and a separate connecting link having one end located in bearing engagement with said bearing surface of the blade and an opposed end pivotally connected to the actuator member in a predetermined position to provide an over-the-center action to lock said blade in said locking position, said locking blade including integrally formed spring means engaged with said casing for applying a biasing force to said locking blade which urges the entire locking blade against the locking action of the actuator member and for moving the locking blade to said unlocked position when the actuator member is moved to its unlocked position.

* * * * *